United States Patent [19]
Davis

[11] 3,827,327
[45] Aug. 6, 1974

[54] LOG CUTTING APPARATUS FOR CUTTING LOGS INTO SELECTED LENGTHS

[76] Inventor: Amos F. Davis, Rt. 1, Box 86, Seven Springs, N.C.

[22] Filed: Oct. 30, 1972

[21] Appl. No.: 301,946

[52] U.S. Cl............................... 83/522, 83/639
[51] Int. Cl........................... B26d 7/28, B26d 5/12
[58] Field of Search............ 83/639, 522, 697, 623, 83/613; 144/3 D

[56] References Cited
UNITED STATES PATENTS

| | | | |
|---|---|---|---|
| 1,933,682 | 11/1933 | Perry et al. | 83/522 |
| 3,398,774 | 8/1968 | Hahn | 144/3 D X |
| 3,623,519 | 11/1971 | Radle | 144/3 D X |
| 3,720,359 | 3/1973 | Cox | 144/3 D X |

Primary Examiner—Willie G. Abercrombie
Attorney, Agent, or Firm—Mills and Coats

[57] ABSTRACT

In abstract, a preferred embodiment of the present invention comprises a logcutting or shearing apparatus adapted to cut logs into selected lengths. More particularly, the log cutting apparatus of the present invention is of the shear type and, accordingly, includes a horizontally reciprocally mounted shearing blade cooperable with a stationary shearing back to receive logs therebetween and to shear the same into preselected lengths by reciprocating the shearing blade back and forth relative to the cooperative shearing back. To appraise the operator of the length of logs being cut, the present invention provides a visual log length indicator with length markers thereon that extend outwardly from the log cutting apparatus and is particularly oriented so as to extend generally perpendicular to the plane of the shearing blade.

15 Claims, 5 Drawing Figures

PATENTED AUG 6 1974 3,827,327

LOG CUTTING APPARATUS FOR CUTTING LOGS INTO SELECTED LENGTHS

The present invention relates to tree harvesting, and more particularly to devices used to cut or shear logs into selected lengths.

In the harvesting of trees, it is common practice to cut the tree trunk and other useable parts of the tree into selected lengths for convenient processing. Typically, this has been done by first cutting the entire tree from the ground and transporting the tree and parts thereof to a central log cutting location where the tree is cut into selected lengths and loaded onto a truck for transporting to a processing facility. This system of tree harvesting does require substantial labor. In fact, many of the machines utilized at the log cutting cite require numerous individuals to assist in positioning the logs into the device for cutting and require a great deal of attention from the operator during the cutting operation, as many of the log cutting devices of the prior art dictate that the operator manually actuate the device during various stages of a single operation.

One particular task that has contributed to the time and effort involved in log cutting operations is the task of positioning the individual logs in the log cutting device such that the length of the cut corresponds to a specified length or falls within a range of lengths prescribed by the contractor and yet allows the maximum useable lengths to be realized from the individual tree being processed. A substantial portion of the problem in cutting the logs to a desired length lies in the inability of the operators to quickly and efficiently determine the length of cut that will result from the particular positioning of the logs within the log cutting device being used. In many instances, the laborers positioning the logs within the log cutting device have been required to delay the log cutting until the length of the log projecting from the cutting device can accurately be determined to see if it falls within the prescribed specification.

After much research and study into the above mentioned probems, the present invention has been devised to provide an automatic log cutting apparatus that requires a minimum amount of labor to operate and which is particularly adapted to perform a complete cutting operation in response to an initial actuation. Moreover, the log cutting apparatus of the present invention is provided with a visual log length indicator that extends generally outwardly from the throat of the cutting assembly thereof and is provided with plate markers spaced thereon to indicate and apparise the operator of the length of the log being cut. Therefore, it follows that by varying the position of the logs within the log cutting apparatus, in view of the visual log length indicator, the operator can be assured of the length of log being cut and consequently can cut log lengths of a predescribed length or range of lengths without undergoing substantial delay each and every time logs are positioned within the log cutting apparatus.

It is, therefore, an object of the present invention to provide a log cutting apparatus that requires a minimal amount of labor to operate and which is automatic to such a degree that the cutting assembly thereof performs a complete cutting operation in response to a single initial actuation thereof.

A further object of the present invention resides in the provision of a log cutting apparatus having associated therewith a visual log length indicator which appraises the operator, or operators, of the length of log cut being performed by the apparatus.

Another object of the present invention is to provide a two-way or reversal visual log length indicator for a log cutting apparatus of the shearing type, the two-way log length indicator being particularly adapted to fit to either side of the log shearing device and to extend therefrom whereby logs may be fed into either side of the log cutting apparatus.

Still a further object of the present invention resides in a log cutting apparatus of the shearing type wherein a hydraulic cylinder is used to reciprocate a shearing blade, and wherein an automatic hydraulic control system is provided therefor which utilizes a fluid control valve for selectively diverting fluid to and from said hydraulic cylinder, and both a solenoid and mechanical control device for actuating said fluid control valve during each log cutting operation.

Another object of the present invention lies in the provision of a log cutting apparatus having a generally compact frame structure that lends itself to being moved from one log cutting site to another.

Other objects and advantages of the present invention will become apparent from a study of the following description and the accompanying drawings which are merely illustrative of the present invention.

Figure 1:
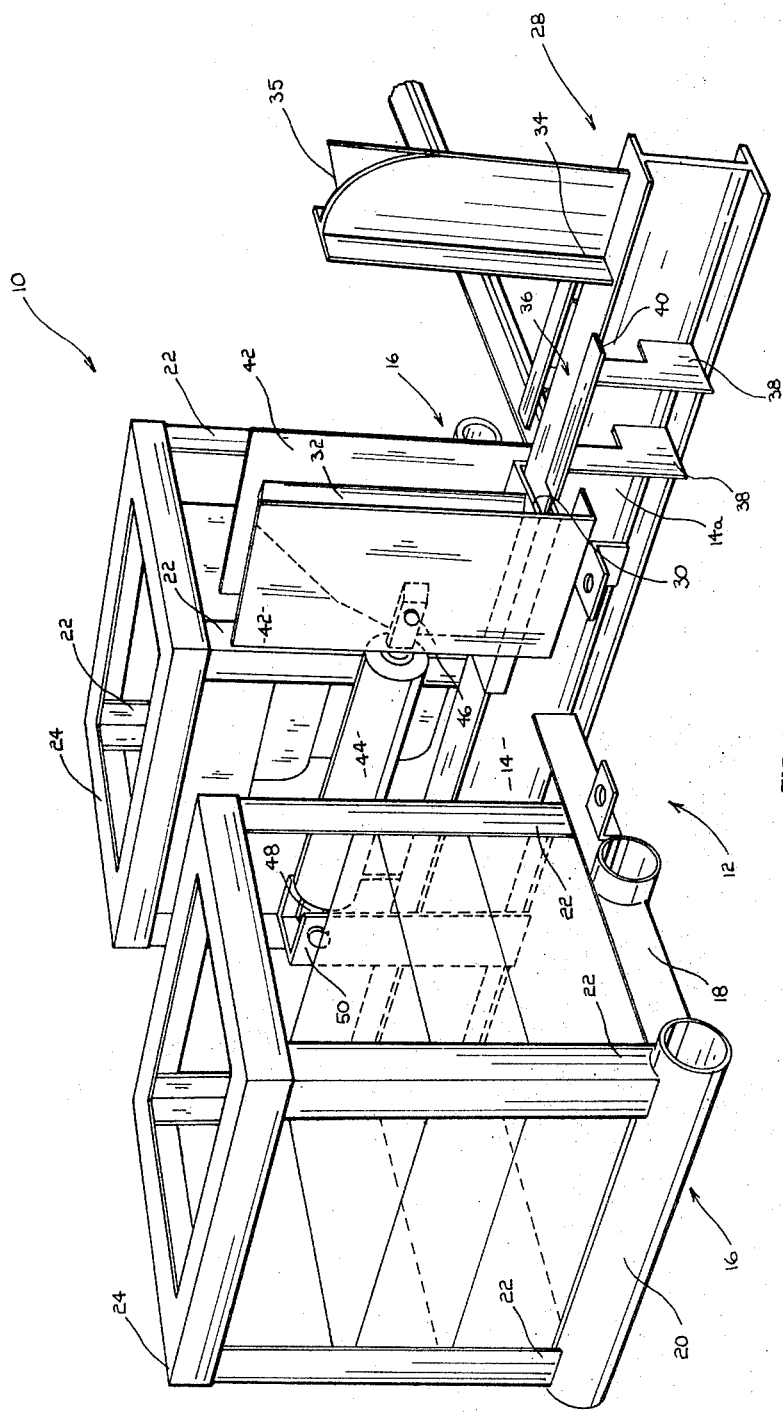
FIG. 1 is a perspective view of the log cutting apparatus drawn in accordance with the present invention.

With further reference to the drawings, particularly FIG. 1, the log cutting apparatus of the present invention is shown therein and indicated generally by numeral 10. The log cutting apparatus 10 comprises a steel frame structure, indicated generally at 12, which includes an I-beam 14 that extends outwardly therefrom and wherein an outer portion 14a of the I-beam functions as the guide rail for the cutting assembly of log cutting apparatus to be hereafter described.

Viewing the frame structure 12 in greater detail, it will be observed that an open rectangular box frame, indicated generally at 16, is disposed on each side of the I-beam 14. With reference to the structure of each open box frame 16, it is noted that each comprises a lower frame structure including a pair of spaced apart side members 18 extending at right angles from the I-beam 14, and an end member 20, in the form of a hollow pipe, fixed to the outer ends of the side members 18 and extending thereacross. Projecting upwardly from the corners of the just described lower frame structure is a plurality of corner posts 22 that have their upper ends joined together by an upper rectangular frame assembly 24.

Figure 4:
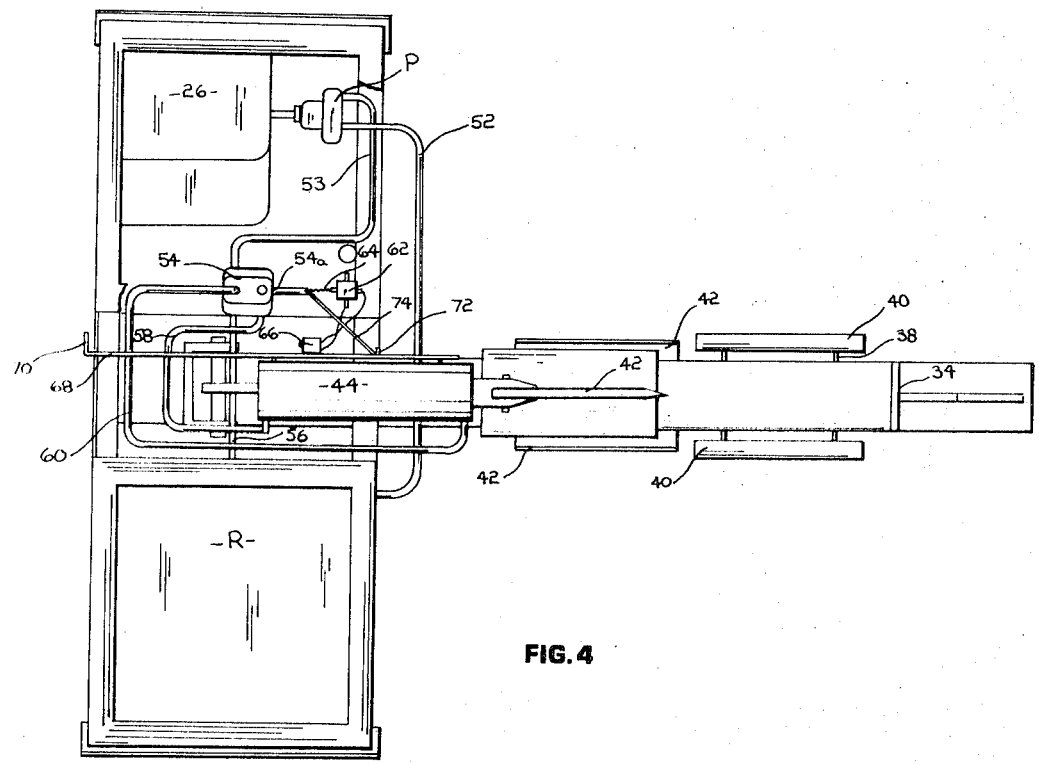
FIG. 4 is a plan view of the log cutting apparatus of the present invention and particularly illustrates the hydraulic control system for controlling the same.

To provide power for operating the log cutting apparatus 10 of the present invention, a power source 26 such as an internal combustion engine is mounted within one of the open box frame 16, as best seen in FIG. 4.

Disposed outwardly of each of the box frames 16 is a log cutting assembly indicated generally at 28. Viewing the log cutting assembly 28 in detail, it is seen that this part of the log cutting apparatus 10 comprises the guide rail 14a extending outwardly from the box frame 16 and provided with a slide 30 that is generally C-shaped such that it is readily adaptable to the upper T-shape portion of the guide rail 14a. Secured to the slide 30 by weldment, or other suitable means, is a shearing blade 32 which is moveable with the slide 30 as it is reciprocated back and forth during the cutting operation. Fixed to an upper portion of the guide rail 14a about the outer most end and opposite the shearing blade 32 is a shearing back 34 which is cooperable with the shearing blade 32 to shear or cut logs situated therebetween during the cutting operation. It should further be pointed out that the upper portion of the shearing back 34 is formed into a V-shaped log pivoting support 35 which enables the operator to position one or more logs thereon with a grapple, not shown, and to pivot the logs to a position where their longitudinal axes generally lie perpendicular to the plane of the shearing blade 32. This assures that the individual logs being cut will be cut in a plane approximately perpendicular to the longitudinal axes of the particular logs being cut.

Continuing to refer to the log cutting assembly 28, it is noted that in the normal loading position that the shearing blade 32 is spaced a distance from the shearing back 34, as shown in FIG. 1. The space between the shearing blade 32 and the shearing back 34 when in the loading position is termed a throat area and is indicated generally by the numeral 36 in FIG. 1.

It has been found that the logs are more efficiently cut when they are supported slightly above the guide rail 14a. In view of this finding, the present invention has devised a log rest or support structure that is generally associated with the log cutting assembly 28 and particularly functions to maintain the logs within the throat 36 of the cutting assembly 28 just above the upper level of the guide rail 14a. The log rest and support structure just referred to is particularly shown in FIG. 1 and may be disposed on either or both sides of the guide rail 14a. This log rest or support structure basically comprises a pair of laterally spaced L-shaped lower members 38 fixed by weldment, or other suitable means, to the middle portion of the I-beam 14 and project generally upwardly therefrom where the upper ends thereof support an upper plate member 40 which, as pointed out above, is disposed in a horizontal plane just above the plane of the upper surface of the guide rail 14a.

As a safety feature, the cutting assembly 28 is provided with a pair of spaced apart blade guards 42, each blade guard being secured to the I-beam 14 and extending upwardly therefrom adjacent an outer side of the shearing blade 32. Therefore, as logs are being positioned within the throat 36 of the cutting assembly 28, the guards 42 serve to protect the blade 32 and generally provide a guide structure for assisting the operator in properly positioning the particular logs to be cut within the throat of the cutting assembly 28.

For powering the shearing blade 32 back and forth relative to the shearing back 34, the present disclosure suggests the use of a double acting hydraulic cylinder 44 and particularly shows the rod end 46 thereof as being connected by a pin, or other suitable means, directly to the shearing blade 32. The anchor end 48 of the hydraulic cylinder 44 is supported by an anchor channel 50 which is fixed or secured to the I-beam 14 and extends generally upwardly herefrom where the anchor end is appropriately secured to an upper portion thereof.

Figure 5:
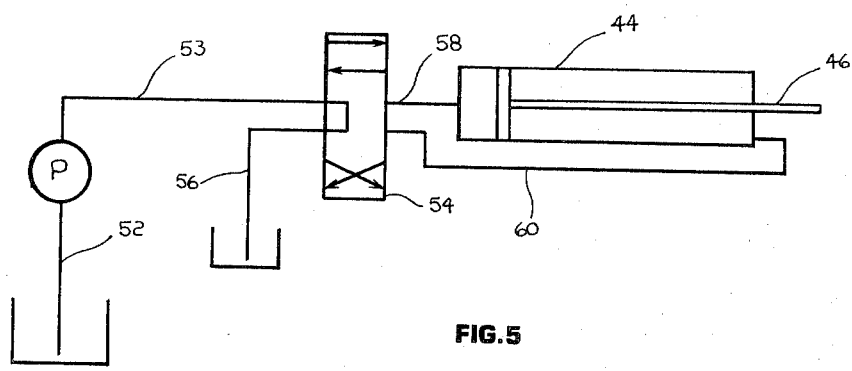
FIG. 5 is a schematic illustration of the hydraulic control system shown structurally in FIG. 4.

Turning now to FIGS. 4 and 5 and the hydraulic control system for controlling the cutting assembly of the log cutting apparatus 10, it will be observed from a study of these drawings that a pump P is drivingly interconnected to the power source 26. The pump P is operative to pump fluid from a reservoir R via a supply line 52. From the reservoir R, the pump P is operative to pump fluid therethrough and into pressure line 53 which leads to a three position hydraulic control valve 54 which includes a slideable internal spool 54a. The hydraulic control valve 54 has a series of fluid flow lines leading therefrom, these lines include line 56 which returns to reservoir R, line 58 which leads from the pump P to the anchor end 48 of the hydraulic cylinder 44, and line 60 which leads from the pump P to the rod end 46 of the hydraulic cylinder 44.

To control the three position hydraulic control valve 54, the present disclosure utilizes a solenoid 62 which is operative to actuate the valve spool 54a through a chain 64 which is interconnected between the two. Although various conventional controls can be provided for the solenoid 62 and the control valve 54, the present disclosure suggests the use of a first remote solenoid actuator, not shown, which would be controlled by the operator who preferably would be positioning the logs within the throat 36 of the cutting assembly 28 by the use of a conventional grappling device or machine. This allows the operator to make the initial actuation which results in the hydraulic cylinder 44 being extended to such an extent that the shearing blade would shear or cut through the log positioned within the throat 36 as the piston of the cylinder 44 is extended. Once a log has been cut, it then becomes necessary to return the shearing blade 32 to its initial loading position, as shown in FIG. 1. To accomplish this, solenoid 62 is provided with a second push button actuator 66 which, as seen in FIG. 4, is disposed generally adjacent hydraulic cylinder 44 and aligned for contact with a stop 70 which is carried on the outer end of an actuator rod 68, the actuator rod 68 being fixed to the cylinder piston and moveable therewith. Thus, it is seen that as the hydraulic cylinder 44 is caused to be extended, the outer stop 70 of the actuator rod 68 engages the second push button solenoid actuator 66 when the shearing blade has completed his cutting stroke and is disposed closely adjacent the shearing back 34.

The engagement of the outer stop 70 with the second solenoid push button actuator 66 causes the spool of the hydraulic valve 54 to be shifted from the top position to the lower position, as viewed in FIG. 5. In the lower position, the fluid from the pump P is directed through the valve 54, into line 60, and on into the rod end of the hydraulic cylinder 44, thereby causing the piston therein to retract. As the piston retracts, the actuator rod 68 moves accordingly therewith and further has fixed thereon an inter stop 72 which is operative upon the shearing blade returning to the initial position to engage a spool centering mechanism 74, shown in FIG. 4, which causes the spool 54a of the control valve 54 to be positioned in the center position, as viewed in FIG. 5. In the center position, the continuous flow of fluid through line 53 into the control valve 54 is returned to the reservoir R via line 56.

Figure 2:
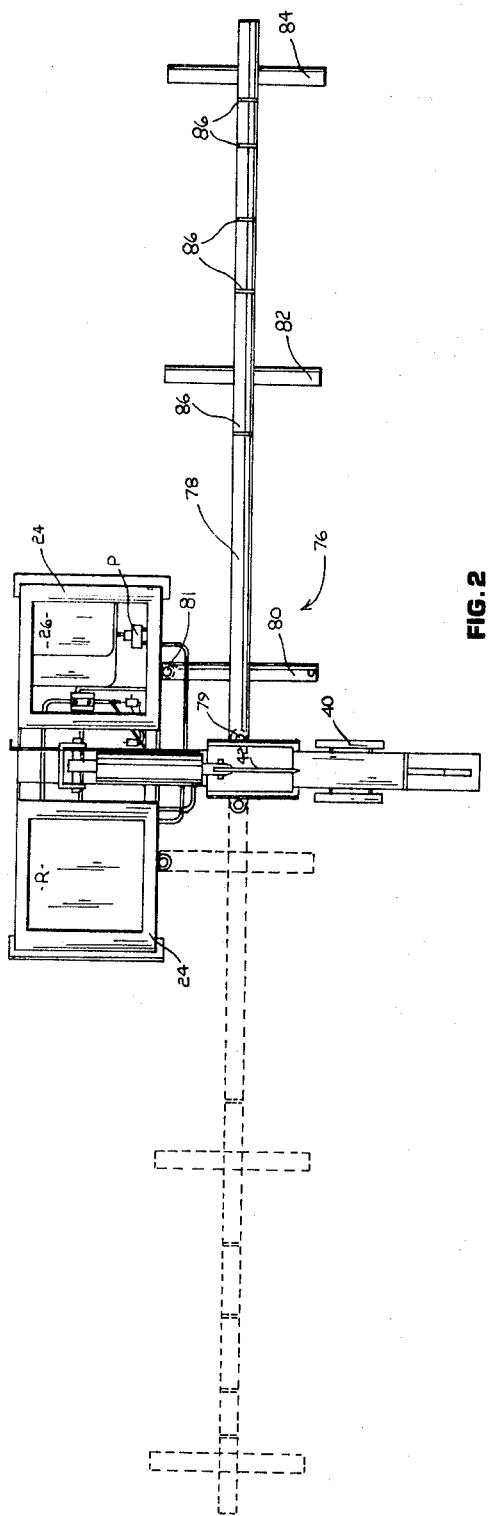
FIG. 2 is a plan view of the log cutting apparatus of the present invention, particularly illustrating the visual log length indicator which may be disposed to either side of the log cutting apparatus.
Figure 3:
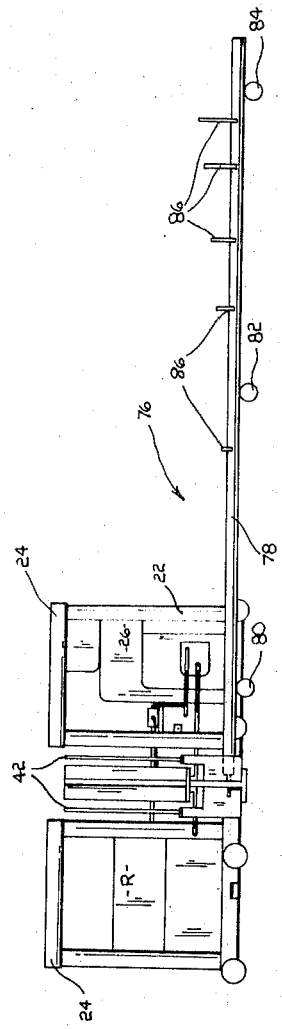
FIG. 3 is a side elevational view of the log cutting apparatus, as shown in FIG. 2.

With particular reference to FIGS. 2 and 3, a visual log length indicator, indicated generally at 76, is shown therein in association with the log cutting apparatus 10 of the present invention. In particular, the visual log length indicator 76 comprises an elongated tubular member 78 that extends outwardly from the I-beam 14 and is generally oriented perpendicular to the plane of the shearing blade 32. The elongated pipe structure 78 is supported by a plurality of axially spaced cross supports 80, 82 and 84. As best seen in FIG. 2, the inner most cross support 80 is provided with openings on opposite ends thereof whereby the visual log length indicator assembly may be pinned by a bolt 81, or other suitable pins to a respective box frame 16. To additionally secure the visual log length indicator assembly 76, the inner end of the elongated pipe structure 78 is pinned to an attaching flange extending outwardly from the I-beam 14 by a second bolt 79.

To indicate to the operator the length of cut that will be realized from the particular positioning of a log or group of logs within the cutting assembly, the elongated pipe structure is provided with a plurality of axially spaced indicia markers at certain intervals thereon. More particularly, the indicia markers comprise a series of plate structures 86 fixed to the elongated pipe 78 and extending upwardly therefrom. Of particular significance is the fact that the plate markers 86 become progressively taller toward the outer end of the elongated pipe structure 78. This is helpful in assisting the operator to distinguish between adjacent plate structures and generally provide a clearer length reading for the operator.

From the above description and general explanation of the operation of the present invention, it is seen that the log cutting apparatus 10 of the present invention provides an automatic cutting device for logs that substantially reduces the labor and effort required in operating the same. In addition, the visual log length indicator 76 shown in conjunction with the log cutting apparatus also contributes to a more efficient log cutting operation as it appraises the operator of the length of logs being cut and consequently, enables the log cutting operation to be continued at a relatively steady pace without interruptions to check and measure log length.

The terms "upper," "lower," "forward," "rearward," etc., have been used herein merely for the convenience of the foregoing specification and in the appended claims to describe the log cutting apparatus for cutting logs into selected lengths and its arts as oriented in the drawings. It is to be understood, however, that these terms are in no way limiting to the invention since the log cutting apparatus for cutting logs into selected lengths may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A log cutting apparatus comprising in combination: a frame structure; a log cutting assembly mounted on said frame structure, said log cutting assembly comprising, horizontal blade support means extending from said frame structure; a shearing back fixed on said horizontal blade support means and extending generally vertically therefrom; blade means slidably mounted on said horizontal support means for horizontal back and forth sliding movement relative to said shearing back, said blade means being vertically disposed and including a vertical cutting edge formed on the edge thereof facing said shearing back such that when said blade means assumes a spaced apart relationship relative to said shearing blade an open top throat area is formed between said blade means and said shearing back whereby groups of logs may be placed conveniently from the top down into said throat area; and power means operatively connected to said blade means for reciprocally driving said blade means horizontally back and forth relative to said vertical shearing back for cooperating therewith to cut the group of logs disposed therebetween in said open top throat area.

2. The log cutting apparatus of claim 1 including a visual log length indicator projecting outwardly from said cutting assembly and including a series of indicia means spaced outwardly thereon for indicating selected distances between said blade means and respective indicia means, whereby selective log lengths may be cut by positioning the individual logs disposed within the cutting assembly relative to said visual log length indicator.

3. The log cutting apparatus of claim 2 wherein said visual log length indicator comprises an elongated member extending outwardly from said cutting assembly and generally disposed perpendicular to the plane of said cutting means, and wherein said indicia means includes a series of spaced apart markers projecting upwardly from said elongated member, each marker representing a preselected distance from said cutting means.

4. The log cutting apparatus of claim 1 wherein said power means for actuating said blade means comprises a double-acting hydraulic cylinder interconnected between said frame structure and said shearing blade for reciprocating said shearing blade back and forth relative to said stationary shearing back.

5. The log cutting apparatus of claim 4 wherein a hydraulic control system is provided for automatically actuating said cylinder and shearing blade during the operation of said log cutting apparatus, said hydraulic control system comprising: a fluid control valve operatively connected to a fluid source and adapted to direct fluid therefrom into said hydraulic cylinder; a solenoid switching mechanism operatively associated with said fluid control valve for shifting the same during a first phase of operation; and a mechanical valve shifting mechanism associated with said control valve for shifting the same during a second phase of operation.

6. The log cutting apparatus of claim 5 wherein said mechanical valve shifting mechanism includes an elongated rod carried by the piston of said hydraulic cylinder and particularly disposed to operatively engage at selected times a solenoid actuator operatively connected to the solenoid switching mechanism, and further adapted to operatively engage the spool of said fluid control valve for mechanically shifting the same.

7. The log cutting apparatus of claim 1 wherein said horizontal blade support means includes a guide rail; structure and a sliding generally C-shaped member confined on said guide rail and slideably therealong, and wherein said shearing blade is secured to said C-shaped sliding member and moveable therewith to cut logs disposed within said throat area of the cutting assembly.

8. The log cutting apparatus of claim 7 wherein said cutting assembly is provided with a side log support structure disposed generally adjacent the throat area thereof, said side log support structure comprising a lower structure secured to said guide rail and extending generally upwardly therefrom, and an upper structure disposed above said lower structure and elevated above the upper level of said guide rail, thereby supporting the individual logs above said guide rail during the cutting operation.

9. The log cutting apparatus of claim 8 wherein the stationary shearing back of said cutting assembly includes an upper generally V-shaped log pivoting structure where the logs may be temporarily stationed and oriented relative to the log cutting apparatus prior to the positioning of the logs within the throat of the cutting assembly.

10. The log cutting apparatus of claim 3 wherein said frame structure includes at least one rectangular open frame housing for receiving and accommodating a power system utilized for powering said log cutting apparatus.

11. A horizontally reciprocating log cutting apparatus adapted to cut a plurality of logs in a single cutting stroke, said log cutting apparatus comprising: a frame structure including a horizontal beam extending therefrom; a generally vertically disposed shearing back fixed to said horizontal beam and extending upwardly therefrom; a sliding mount means slidably mounted on said beam for sliding back and forth movement thereon; a vertically oriented blade means operatively secured on said sliding mount means for back and forth movement thereon, said blade means having a vertical cutting edge formed along the edge thereof closest to said shearing back and normally assuming an opening noncutting position spaced apart relative to said shearing back so as to normally define an open top throat area between said shearing back and said spaced apart blade means whereby a plurality of grouped logs may be placed from the top into said throat area such that said logs lie between said shearing back and said blade means; and means for driving said blade means in a horizontal reciprocating fashion such that groups of logs placed in the open throat area of said log cutting apparatus are cut by said blade means in cooperation with said shearing back as said blade means move from said open noncutting position to said shearing back.

12. The log cutting apparatus of claim 11 wherein said means for reciprocally driving said blade means includes: a hydraulic cylinder having one end anchored to said frame structure and extending generally horizontally therefrom where the other end is operatively connected to said blade means; a control valve operatively connected to said hydraulic cylinder for directing fluid to and from said cylinder; and control means operatively associated with said control valve for controlling said hydraulic cylinder in response to the stroke thereof whereby the blade means connected to said hydraulic cylinder may be automatically reciprocated back and forth during the log cutting operation.

13. The log cutting apparatus of claim 12 wherein said control means includes: actuating means moveable with the piston of said hydraulic cylinder; and means responsive to the movement of said actuating means for selectively actuating and controlling said control valve.

14. The log cutting apparatus of claim 13 wherein said actuating means comprises an elongated actuator rod disposed adjacent said hydraulic cylinder and operatively connected to the piston thereof such that said actuator rod moves back and forth with the piston of said hydraulic cylinder; and wherein said means responsive to the movement of said actuating means for controlling said control valve comprises a solenoid switch operatively connected to said control valve and disposed adjacent said actuating rod for selective engagement therewith, thus giving rise to a first element of control for said control valve; and a mechanical link directly connected to said control valve and extending therefrom for engagement with said actuator rod thus giving rise to a second element of control for said control valve.

15. A log cutting apparatus comprising in combination: a frame structure; a log cutting assembly mounted on said frame structure and including a throat area for receiving logs therein and cutting means moveable through said throat area for cutting individual logs situated therein; power means for actuating said cutting means; and a visual log length indicator assembly projecting outwardly from said cutting assembly or indicating the length of cut to be realized from a particular positioning of logs within said cutting assembly; said visual log length indicator comprising a tubular-shaped elongated member extending outwardly from said cutting assembly and generally disposed perpendicular to the plane of said cutting means; and wherein said indicia means includes a plurality of spaced apart marker plates, each marker plate being fixed to said tubular-shaped elongated member and projecting upwardly therefrom with the height of each individual marker plate becoming progressively higher toward the end of said elongated member opposite the cutting assembly.

* * * * *